(12) United States Patent
Voegtle et al.

(10) Patent No.: US 9,752,666 B2
(45) Date of Patent: Sep. 5, 2017

(54) TORQUE CONVERTER

(71) Applicant: Schaeffler Technologies AG & Co. KG, Herzogenaurach (DE)

(72) Inventors: Benjamin Voegtle, Karlsruhe (DE); Benjamin Daniel, Pforzheim (DE); Thorsten Krause, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 952 days.

(21) Appl. No.: 14/057,804

(22) Filed: Oct. 18, 2013

(65) Prior Publication Data

US 2014/0044523 A1   Feb. 13, 2014

Related U.S. Application Data

(63) Continuation of application No. PCT/DE2012/000378, filed on Apr. 10, 2012.

(30) Foreign Application Priority Data

Apr. 21, 2011 (DE) .................. 10 2011 018 622

(51) Int. Cl.
*F16H 45/02* (2006.01)
*F16H 45/00* (2006.01)

(52) U.S. Cl.
CPC ............. *F16H 45/00* (2013.01); *F16H 45/02* (2013.01); *F16H 2045/0231* (2013.01); *F16H 2045/0247* (2013.01); *F16H 2045/0263* (2013.01)

(58) Field of Classification Search
CPC .. F16H 45/00; F16H 45/02; F16H 2045/0231; F16H 2045/0247;
(Continued)

(56) References Cited

U.S. PATENT DOCUMENTS 6,126,568 A * 10/2000 Sudau .................. F16H 45/02
192/212
7,658,679 B2    2/2010 Avins et al.
(Continued)

FOREIGN PATENT DOCUMENTS

DE      102008057648 A1    6/2009
DE      102009024743 A1    1/2010
(Continued)

OTHER PUBLICATIONS

Corresponding CN Office Action dated Jul. 28, 2015.

*Primary Examiner* — Dwayne J White
*Assistant Examiner* — Aaron R Eastman
(74) *Attorney, Agent, or Firm* — Simpson & Simpson, PLLC

(57) ABSTRACT

A torque converter for transferring torque from an input shaft to an output shaft, having a turbine wheel, an impeller connected to the input shaft to drive the turbine wheel hydrodynamically, a centrifugal force pendulum connected to the turbine wheel to damp torsional vibrations, a first torsion damper to drive the output shaft by means of the turbine wheel, and a converter clutch and a second torsion damper for selective torsionally damped coupling of the input shaft with the turbine wheel. One of the torsion dampers in this case includes two torsion damper elements, which are arranged in series with each other.

18 Claims, 1 Drawing Sheet

(58) Field of Classification Search
CPC ... F16H 2045/0263; F16F 15/14; F16F 15/12; F16D 3/12
USPC ........................................ 416/169 R; 192/3.3
See application file for complete search history.

(56) References Cited

U.S. PATENT DOCUMENTS

| | | | |
|---|---|---|---|
| 8,342,306 B2 | 1/2013 | Werner et al. | |
| 2004/0185940 A1* | 9/2004 | Yamamoto | F16F 15/12366 464/68.4 |
| 2009/0151344 A1* | 6/2009 | Degler | F16F 15/12366 60/338 |
| 2009/0272108 A1* | 11/2009 | Degler | F16F 15/12353 60/338 |
| 2009/0283376 A1* | 11/2009 | Degler | F16F 15/12353 192/3.28 |

FOREIGN PATENT DOCUMENTS

| | | |
|---|---|---|
| DE | 102009042837 A1 | 4/2010 |
| DE | 102011006533 A1 | 11/2011 |
| WO | 2010043194 A1 | 4/2010 |
| WO | 2012142995 A1 | 10/2012 |

\* cited by examiner

TORQUE CONVERTER

CROSS-REFERENCE TO RELATED APPLICATIONS

This application is filed under 35 U.S.C. §120 and §365(c) as a continuation of International Patent Application No. PCT/DE2012/000378 filed Apr. 10, 2012, which application claims priority from German Patent Application No. 10 2011 018 622.0 filed Apr. 21, 2011, which applications are incorporated herein by reference in their entireties.

FIELD OF THE INVENTION

The invention relates to a torque converter.

BACKGROUND OF THE INVENTION

A torque converter may be employed to transfer torque from a drive motor to a transmission in a motor vehicle. The torque converter includes a turbine having an impeller and a turbine wheel, which are at least partially washed by a liquid, so that the rotating impeller drives the turbine wheel. To minimize losses, a converter clutch is also provided, in order to couple the movement of the turbine wheel to that of the impeller mechanically when needed. The transfer of torque takes place, for example, during the driving-off process of the motor vehicle through the hydrodynamic coupling by means of the turbine, and during normal driving operation through the mechanical coupling by means of the converter clutch.

To reduce torsional vibrations around an input shaft of the torque converter during driving operation as much as possible before they reach an output shaft of the torque converter, various systems on and in the torque converter are known, which usually include a centrifugal force pendulum and a torsion damper.

German Patent Application No. 10 2008 057 648 A1 proposes to connect a rotational element having a centrifugal force pendulum to the input shaft by means of a first torsion damper, and to the output shaft by means of a second torsion damper. With this system, it should be possible to better reduce non-uniformities of rotation in the transfer of force between the input shaft and the output shaft.

German Patent Application No. 10 2009 024 743 A1 proposes to attach the centrifugal force pendulum to the turbine wheel, and to provide a torque converter lockup clutch to bridge the turbine when operating under load. A first torsion damper introduces torque into the output shaft from the turbine wheel, and a second torsion damper introduces torque into the output shaft from the torque converter lockup clutch, in this case, the second torsion damper consists of two torsion damper elements, which are arranged in series. The arrangement of the damper elements is intended to contribute to minimizing the construction space needed by the described torque converter.

Torque converters of the described type represent in principle a torsional vibration system which can be set in torsional vibration, for example, by rotational non-uniformities of a motor which drives the drive shaft. The centrifugal force pendulum acts as a rotational speed adaptive absorber, and vibrates in contrary phase to the rotational element on which it is placed. The lower the spring rate of the torsional damper that connects the input shaft to the rotating body, the better the isolation of the rotating body from the input shaft with regard to the rotational irregularities and the smaller the angle of oscillation of the centrifugal force pendulum.

For reasons of design, for example, because of limited available construction space, there is usually only a limited oscillation angle available for the centrifugal force pendulum. Under the influence of strong torsional vibrations, the centrifugal force pendulum may run into a mechanical stop, which can result in very poor isolation of the output shaft from the torsional vibrations. In addition, noises connected with the impacts can be perceived as unpleasant, and the impacts can result in increased wear or fatiguing of the elements in question.

Therefore, it is the object of the invention to specify a hydrodynamic torque converter that has improved resistance to torsional vibrations.

BRIEF SUMMARY OF THE INVENTION

A hydrodynamic torque converter according to the invention for transferring torque from an input shaft to an output shaft includes a turbine wheel, an impeller connected to the input shaft to drive the turbine wheel hydrodynamically, a centrifugal force pendulum connected to the turbine wheel to damp torsional vibrations, a first torsion damper to drive the output shaft by means of the turbine wheel, and a converter clutch and a second torsion damper for a selective torsionally damped coupling of the input shaft with the turbine wheel. In this case, one of the torsion dampers includes two torsion damper elements, which are arranged in series with each other.

Spring capacity of the torsion damper can be increased through the use of two torsion damper elements, so that improved isolation of the turbine wheel is achieved and the centrifugal force pendulum can have a reduced angle of oscillation. A stopping or landing of the centrifugal force pendulum can be avoided, which can prevent the isolation from worsening. In addition, the available construction space can be made more useful through the serial arrangement of the torsion damper elements.

In an embodiment, at least one of the torsion dampers may include yet another torsion damper element. Thus, arrangements of the torque converter having four or more torsion damper elements are also possible. Each of the additional torsion damper elements can contribute to improving the isolation and keeping the angle of oscillation of the centrifugal force pendulum below a maximum angle of oscillation.

In another embodiment, the first torsion damper includes a first torsion damper element and the second torsion damper includes a second and a third torsion damper element. Torsional vibrations are usually more likely to be expected from the side of the input shaft, and can be more readily reduced due to the torsion damper elements arranged in series on the input shaft side. Design effort and material cost can be minimized by this arrangement and the construction space required by the system can be reduced.

If the second torsion damper includes a plurality of torsion damper elements, then one of these torsion damper elements can include a stop to bridge the torsion damping above a predetermined transferred torque. The stop is provided, for example, on a torsion damper element that is rigidly connected to the turbine wheel, if the torsion damping is bridged, the entire mass of the bridged torsion damper element is rigidly connected to the turbine wheel. The rotating mass of the turbine wheel is thus increased, so that the rotational inertia of the turbine wheel can be increased and the angle of oscillation of the centrifugal force pendulum can be reduced.

One of the torsion damper elements of the second torsion damper can also include a frictional element to reduce the torsion damping depending on transferred torque. This enables a similar effect to that achieved with the stop described above for bridging the torsion damping. However, when a frictional element is used, the reduction of the torsional damping can be gradually lessened depending on the transferred torque. This makes it possible to reduce a danger of secondary vibrational effects and to lessen material wear or material fatigue. In combination with the stop, an impact noise of the described stop can be reduced or avoided.

For example, the frictional element can be set up to reduce the torsion damping only above a predetermined transferred torque. If the transferred torque is less than the predetermined torque, then the torsion damper element can be operated undiminished in order to cancel out or isolate vibrations.

In an embodiment, the frictional element is provided on a torsion damper element that is rigidly connected to the turbine wheel.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
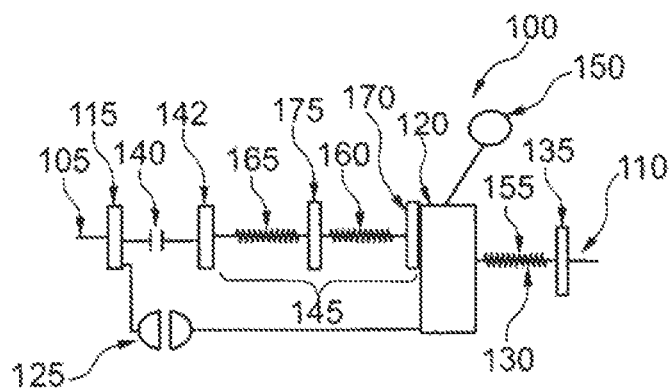
FIG. 1 is a schematic force flow diagram of a hydrodynamic torque converter.

FIG. 1 shows a schematic force flow diagram of dynamic torque converter 100.

Torque converter 100 includes input shaft 105, which is usually connected to a motor, for example, a reciprocating internal combustion engine of a motor vehicle. Output shaft 110 of torque converter 100 is usually connected to a transmission, for example, a drive transmission of the motor vehicle. Torque converter 100 is set up to transfer torque from input shaft 105 to output shaft 110.

Two different torque flows can be realized by means of torque converter 100, which can be activated depending on the operating state of the motor vehicle. The first torque flow is realized hydrodynamically, and is used, for example, when starting to drive the motor vehicle, while the second torque flow is realized mechanically, and is used during normal driving operation to avoid a transmission loss of the hydrodynamic transmission. Usually, at every point in time a maximum of one of the torque flows is activated, whereas during transition from one torque flow to the other both may also be entirely or partially activated.

The first torque flow runs from input shaft 105 to impeller 115 and from there through hydrodynamic transmission to turbine wheel 120. Sketched in symbolically between impeller 115 and turbine wheel 120 is hydraulic clutch 125, which models this section of the first torque flow. Turbine wheel 120 is connected by means of first torsion damper 130 to flange 135, at which the torque transmitted from the input shaft is made available to output shaft 110.

The second torque flow connects input shaft 105 with the turbine wheel in a mechanical manner. Input shaft 105 or impeller 115 is connected to controllable converter clutch 140, in order to enable or to sever the second torque flow. Rotating plate 142 of converter clutch 140 forms a turnover point of the second torque flow from the converter clutch into second torsion damper 145, which introduces the second torque flow into turbine wheel 120. From turbine wheel 120 on, the second torque flow continues exactly like the first torque flow, through first torsion damper 130 and flange 135 and on to output shaft 110.

Attached to turbine wheel 120 is centrifugal force pendulum 150, for a speed-adaptive deletion of torsional vibrations.

While first torsion damper 130 in the depiction in FIG. 1 has only first torsion damper element 155, second torsion damper 145 has second torsion damper element 160 and third torsion damper element 165, two torsion damper elements 160 and 165 being arranged in series with each other. To the right of torsion damper elements 160 and 165, optional intermediate flanges 170 and 175, respectively, are indicated. In other embodiments than that depicted in FIG. 1, torsion dampers 130 and 145 may also each include a greater or smaller number of torsion damper elements, where one of torsion dampers 130, 145 includes at least one torsion damper element and other torsion damper 130, 145 includes at least two torsion damper elements.

Through the serial arrangement of two torsion damper elements, relevant torsion damper 130, 145 can be provided with a greater spring travel. This makes it possible to reduce a torsional angle of centrifugal force pendulum 150 relative to turbine wheel 120, so that centrifugal force pendulum 150 can be kept from completely utilizing an available torsional angle or running against a stop installed at the end of the torsional angle.

Figure 2:
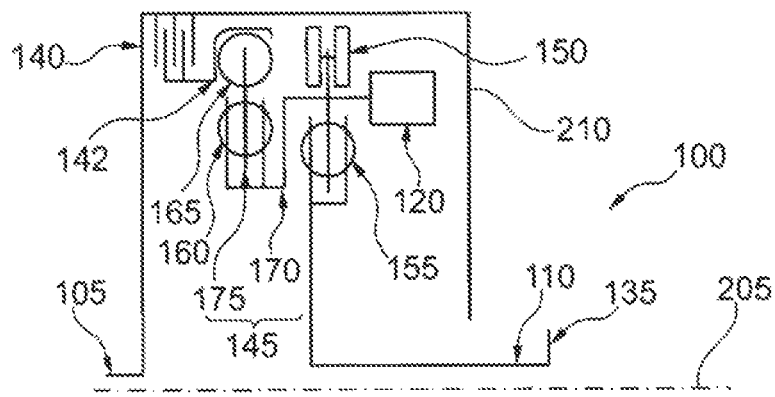
FIG. 2 is a schematic arrangement of elements of the torque converter from FIG. 1; and, FIG. 3 is a schematic force flow diagram of a variation of the hydrodynamic torque converter from FIG. 1.

FIG. 2 shows a schematic arrangement of elements of torque converter 100 from FIG. 1. The arrangement of the elements of torque converter 100 depicted in FIG. 2 is an example, and indicates a distribution, which can be both space-saving and also efficient in terms of vibration damping.

In reference to axis of symmetry 205, around which input shaft 105 and output shaft 110 are rotatably mounted, the upper half of a longitudinal section is represented by torque converter 100. Impeller 115 is not included in the depiction in FIG. 2. Also not shown are sealing elements, bearings and other known elements of the torque converter that have no direct influence on the present functional principle.

Input shaft 105 is connected to housing 210 in which the other elements of torque converter 100 are accommodated. Housing 210 contains a fluid for the hydrostatic coupling of impeller 115 with turbine wheel 120. Converter clutch 140 is designed as a multiple-disk wet clutch, which includes a number of clutch plates and lamellae that can be pressed against each other in an axial direction in order to transmit the torque of the housing through mutual friction. The lamellae are attached to housing 210 and the friction disks to rotating plate 142 or vice versa. The rotary motion of rotating plate 142 is transmitted by means of third torsion damper element 165 to second intermediate flange 175, while third torsion damper element 165 includes a coil spring that is situated essentially on a circumference around axis of symmetry 205, and whose ends are connected to rotating plate 142 or to second intermediate flange 175. With increasing torque transmitted by third torsion damper element 165, the coil spring is compressed to an increasing degree.

In a manner similar to third torsion damper element 165, second torsion damper element 160 includes another coil spring by means of which the rotary motion of second intermediate flange 175 is transmitted to first intermediate flange 170. Second torsion damper element 160 and third torsion damper element 165 together form second torsion damper 145.

In addition to second torsion damper element 160, first intermediate flange 170 is also connected to turbine wheel 120, centrifugal force pendulum 150 and first torsion damper element 155, which is constructed the same as torsion damper elements 160 and 165. Centrifugal force pendulum 150 is supported in such a way that it can be pivoted in the circumferential direction around axis of symmetry 205 about an axis that lies radially outside axis of symmetry 205. First torsion damper element 155 transmits the motion of first intermediate flange 170 or of turbine wheel 120 to flange 135, which is connected to output shaft 110.

Figure 3:
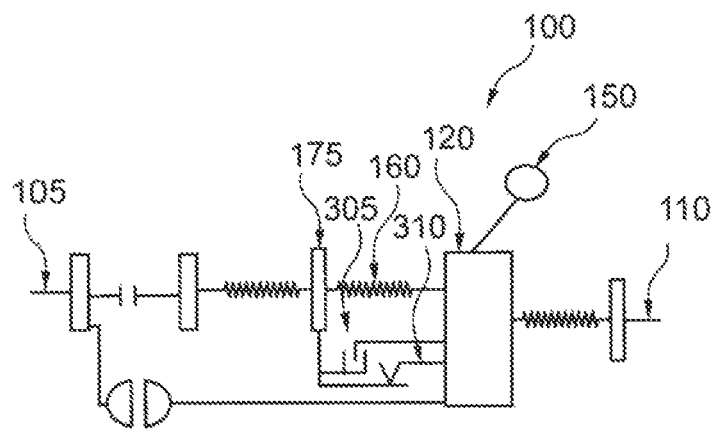

FIG. 3 shows a schematic force flow diagram of a variation of hydrodynamic torque converter 100 from FIG. 1. Contrary to the depiction in FIG. 1, opposite ends of second torsion damper element 160 are connected to opposite ends of stop 305 and to opposite ends of frictional element 310. In addition, in the depicted embodiment, first intermediate flange 170 has been eliminated, although it may also be provided in other embodiments. Stop 305 or frictional element 310 can also be eliminated in other embodiments.

Stop 305 is set up to limit a maximum relative motion between mutually opposing ends of second torsion damper element 160. Such limiting can be realized, for example, by a stop element, or a bolt guided in a groove. If the torque transmitted by second torsion damper element 160 exceeds a predetermined value, which is determined by a spring constant and a spring travel of second torsion damper element 160, then stop 305 limits the relative movement of second intermediate flange 175 with respect to turbine wheel 120. In consequence, all rotating masses between second intermediate flange 175 and turbine wheel 120 are connected to each other, thereby resulting in an increased rotational inertia of the rotating element to which centrifugal force pendulum 150 is connected. Torsional vibrations, which are introduced into torque converter 100, for example, on the part of input shaft 105, can thus be reduced without necessitating an angle of oscillation of the centrifugal force pendulum that exceeds an available angle of oscillation.

Frictional element 310 operates similarly to stop 305 on the opposing ends of second torsion damper element 160, with the difference that the connection through the union is less rigid than through stop 305. In one embodiment, a coefficient of friction of frictional element 310 increases as a function of a torsional angle between the ends of frictional element 310, or between second intermediate flange 175 and turbine wheel 120. In another embodiment, frictional element 310 can be set up to permit a predetermined torsional angle without exerting a frictional force. In still another embodiment, both stop 305 and frictional element 310 are provided on torque converter 100.

The features described in reference to FIG. 3, which go beyond the features of the embodiment of torque converter 100 depicted in FIG. 1, are freely combinable with the embodiment depicted in FIG. 2.

Thus, it is seen that the Objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS 100 hydrodynamic torque converter
105 input shaft
110 output shaft
115 impeller
120 turbine wheel
125 hydraulic clutch
130 first torsion damper
135 flange
140 converter clutch
142 rotating plate
145 second torsion damper
150 centrifugal force pendulum
155 first torsion damper element
160 second torsion damper element
165 third torsion damper element
170 first intermediate flange
175 second intermediate flange
205 axis of symmetry
210 housing
305 stop
310 frictional element

What is claimed is:
1. A torque converter for transferring a torque from an input shaft to an output shaft, comprising:
 a turbine wheel;
 an impeller connected to the input shaft and arranged to hydrodynamically connect to the turbine wheel through a hydraulic clutch;
 a centrifugal force pendulum connected to the turbine wheel to damp torsional vibrations;
 a first torsion damper, including:
  a first input part connected to the turbine wheel; and,
  a first output part connected to the output shaft; and, a second torsion damper, including:
- a second input part arranged to connect to the input shaft through a lockup clutch; and,
- a second output part connected to the turbine wheel, wherein at least one of the torsion dampers includes two torsion damper elements, which are arranged in series with each other.

2. The torque converter as recited in claim 1, wherein the torsion damper that does not include the two torsion damper elements includes an additional torsion damper element.

3. The torque converter as recited in claim 1, wherein the first torsion damper includes a first torsion damper element and the second torsion damper includes a second and a third torsion damper element.

4. The torque converter as recited in claim 3, wherein one of the torsion damper elements of the second torsion damper includes a stop to bridge the torsion damping above a predetermined transmitted torque.

5. The torque converter as recited in claim 4, wherein the stop is provided on a torsion damper element that is rigidly connected to the turbine wheel.

6. The torque converter as recited in claim 3, wherein one of the torsion damper elements of the second torsion damper includes a frictional element to reduce the torsion damping as a function of a transmitted torque.

7. The torque converter as recited in claim 6, wherein the frictional element is set up to reduce the torsion damping only above a predetermined transmitted torque.

8. The torque converter as recited in claim 6, wherein the frictional element is provided on a torsion damper element that is rigidly connected to the turbine wheel.

9. A torque converter for transferring a torque from an input shaft to an output shaft, comprising:
- a turbine wheel;
- an impeller connected to the input shaft and arranged to hydrodynamically connect to the turbine wheel;
- a centrifugal force pendulum connected to the turbine wheel to damp torsional vibrations;
- a first torsion damper, including:
  - a first input part connected to the turbine wheel; and,
  - a first output part connected to the output shaft; and,
- a second torsion damper, including:
  - a second input part arranged to connect to the impeller; and,
  - a second output part connected to the turbine wheel, wherein at least one of the torsion dampers includes two torsion damper elements, which are arranged in series with each other.

10. The torque converter as recited in claim 9, wherein at least one of the torsion dampers includes an additional torsion damper element.

11. The torque converter as recited in claim 9, wherein the first torsion damper includes a first torsion damper element and the second torsion damper includes a second and a third torsion damper element.

12. The torque converter as recited in claim 11, wherein one of the torsion damper elements of the second torsion damper includes a stop to bridge the torsion damping above a predetermined transmitted torque.

13. The torque converter as recited in claim 12, wherein the stop is provided on a torsion damper element that is rigidly connected to the turbine wheel.

14. The torque converter as recited in claim 11, wherein one of the torsion damper elements of the second torsion damper includes a frictional element to reduce the torsion damping as a function of a transmitted torque.

15. The torque converter as recited in claim 14, wherein the frictional element is set up to reduce the torsion damping only above a predetermined transmitted torque.

16. The torque converter as recited in claim 14, wherein the frictional element is provided on a torsion damper element that is rigidly connected to the turbine wheel.

17. The torque converter as recited in claim 9, wherein the impeller is arranged to hydrodynamically connect to the turbine wheel through a hydraulic clutch.

18. The torque converter as recited in claim 9, wherein the second input part is arranged to non-rotatably connect to the input shaft through a clutch converter.

* * * * *